US010575231B2

(12) United States Patent
Gay et al.

(10) Patent No.: US 10,575,231 B2
(45) Date of Patent: Feb. 25, 2020

(54) SYSTEM FOR CONNECTION CHANNEL ADAPTION USING ROBOTIC AUTOMATION

(71) Applicant: BANK OF AMERICA CORPORATION, Charlotte, NC (US)

(72) Inventors: Gerard P. Gay, Seattle, WA (US); Donald Joseph Cardinal, Celina, TX (US); Katherine Dintenfass, Lincoln, RI (US); Jim McCormack, Charlotte, NC (US); Konstantin Shushkovsky, Brooklyn, NY (US); Chris Stott, Charlotte, NC (US); Cameron Darnell Wadley, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 36 days.

(21) Appl. No.: 15/803,198

(22) Filed: Nov. 3, 2017

(65) Prior Publication Data
US 2019/0141596 A1 May 9, 2019

(51) Int. Cl.
| | |
|---|---|
| *H04W 36/02* | (2009.01) |
| *H04W 36/18* | (2009.01) |
| *H04W 36/30* | (2009.01) |
| *H04W 36/36* | (2009.01) |
| *G05B 19/418* | (2006.01) |

(52) U.S. Cl.
CPC ........ *H04W 36/18* (2013.01); *G05B 19/4185* (2013.01); *G05B 19/41885* (2013.01); *H04W 36/026* (2013.01); *H04W 36/30* (2013.01); *H04W 36/36* (2013.01); *G05B 19/418* (2013.01)

(58) Field of Classification Search
CPC ... H04W 36/026; H04W 36/18; H04W 36/30; H04W 36/36; G05B 19/418
See application file for complete search history.

(56) References Cited

U.S. PATENT DOCUMENTS

| | | | |
|---|---|---|---|
| 5,907,709 | A | 5/1999 | Cantey et al. |
| 6,738,908 | B1 | 5/2004 | Bonn et al. |
| 7,174,563 | B1 | 2/2007 | Brownlie et al. |

(Continued)

OTHER PUBLICATIONS

Kyoungho An, Resource Management and Fault Tolerance Principles for Supporting Distributed Real-time and Embedded Systems in the Cloud, Dec. 3, 2012, ACM, pp. 1-6. (Year: 2012).

(Continued)

*Primary Examiner* — Alpus Hsu
(74) *Attorney, Agent, or Firm* — Michael A. Springs; Moore & Van Allen PLLC; Nicholas C. Russell

(57) ABSTRACT

Embodiments of the present invention are directed to providing connection channel adaption using robotic automation. The invention leverages a robotic process automation module to generate an operation record based on previous user device input in order to automatically recover and continue a previous interaction with an entity platform conducted over a terminated connection channel. The system automatically establishes a new connection channel upon determining the initial channel termination while retaining previous user input interaction progression within the entity platform. Further, the module may be configured to transform the user input to be compatible with the new connection channel allowing for seamless continuation of the interaction to minimize downtime.

20 Claims, 4 Drawing Sheets

(56) References Cited

U.S. PATENT DOCUMENTS

| | | |
|---|---|---|
| 7,260,844 B1 | 8/2007 | Tidwell et al. |
| 7,383,578 B2 | 6/2008 | Blake et al. |
| 7,680,809 B2 | 3/2010 | Deng et al. |
| 7,752,554 B2 | 7/2010 | Biggs et al. |
| 7,861,252 B2 | 12/2010 | Uszok et al. |
| 7,937,624 B2 | 5/2011 | Qing et al. |
| 7,966,654 B2 | 6/2011 | Crawford |
| 7,966,655 B2 | 6/2011 | Acharya et al. |
| 7,966,659 B1 | 6/2011 | Wilkinson et al. |
| 8,065,719 B2 | 11/2011 | Yang |
| 8,171,406 B1 | 5/2012 | Newstadt et al. |
| 8,239,674 B2 | 8/2012 | Lee et al. |
| 8,285,652 B2 | 10/2012 | Biggs et al. |
| 8,397,282 B2 | 3/2013 | Turley et al. |
| 8,418,240 B2 | 4/2013 | Wool |
| 8,448,139 B2 | 5/2013 | Ghosh |
| 8,549,643 B1 | 10/2013 | Shou |
| 8,572,733 B1 | 10/2013 | Rockwood |
| 8,588,767 B2 | 11/2013 | Fujimoto et al. |
| 8,793,578 B2 | 7/2014 | Mounty et al. |
| 8,819,825 B2 | 8/2014 | Keromytis et al. |
| 8,935,673 B1 | 1/2015 | Ashkenazi et al. |
| 8,955,743 B1 | 2/2015 | Block et al. |
| 9,021,419 B2 * | 4/2015 | Pana .................. G06F 8/38 717/105 |
| 9,105,143 B1 | 8/2015 | Huggins et al. |
| 9,215,213 B2 | 12/2015 | Bansal et al. |
| 9,280,406 B2 | 3/2016 | Ghosh |
| 9,311,632 B1 | 4/2016 | Dent |
| 9,356,942 B1 | 5/2016 | Joffe |
| 9,356,957 B2 | 5/2016 | Keromytis et al. |
| 9,450,901 B1 * | 9/2016 | Smullen ................ H04L 51/046 |
| 9,462,013 B1 | 10/2016 | Boss et al. |
| 9,555,544 B2 * | 1/2017 | Bataller .................. B25J 9/163 |
| 9,600,456 B2 | 3/2017 | Sriganesh et al. |
| 9,641,544 B1 | 5/2017 | Treat et al. |
| 9,647,968 B2 * | 5/2017 | Smullen ................ H04L 67/322 |
| 9,667,596 B2 | 5/2017 | Halabi |
| 9,674,222 B1 | 6/2017 | Joffe |
| 9,817,967 B1 | 11/2017 | Shukla et al. |
| 9,923,908 B2 | 3/2018 | Boss et al. |
| 10,110,629 B1 | 10/2018 | Kruse et al. |
| 10,187,337 B2 * | 1/2019 | Smullen ................ H04L 67/322 |
| 10,324,457 B2 * | 6/2019 | Neelakandan ... G05B 19/41865 |
| 2002/0184528 A1 | 12/2002 | Shevenell et al. |
| 2003/0046583 A1 | 3/2003 | Goldman et al. |
| 2004/0168173 A1 | 8/2004 | Cohen et al. |
| 2005/0044418 A1 | 2/2005 | Miliefsky |
| 2005/0076237 A1 | 4/2005 | Cohen et al. |
| 2005/0166072 A1 | 7/2005 | Converse et al. |
| 2006/0090136 A1 | 4/2006 | Miller et al. |
| 2006/0191010 A1 | 8/2006 | Benjamin |
| 2007/0143847 A1 | 6/2007 | Kraemer et al. |
| 2008/0168425 A1 | 7/2008 | Sen et al. |
| 2010/0223327 A1 | 9/2010 | Srivastava et al. |
| 2011/0131644 A1 | 6/2011 | Keanini et al. |
| 2013/0227697 A1 | 8/2013 | Zandani |
| 2014/0359708 A1 | 12/2014 | Schwartz |
| 2015/0213369 A1 | 7/2015 | Brandt et al. |
| 2016/0006755 A1 | 1/2016 | Donnelly et al. |
| 2016/0048502 A1 | 2/2016 | Montenegro et al. |
| 2016/0134653 A1 | 5/2016 | Vallone et al. |
| 2016/0335016 A1 | 11/2016 | Kurian et al. |
| 2017/0177416 A1 | 6/2017 | Altman et al. |
| 2017/0269972 A1 | 9/2017 | Hosabettu et al. |
| 2017/0270431 A1 | 9/2017 | Hosabettu et al. |
| 2017/0352041 A1 | 12/2017 | Ramamurthy et al. |
| 2017/0364355 A1 | 12/2017 | Nitschke et al. |
| 2018/0160309 A1 | 6/2018 | Turgeman et al. |
| 2018/0197123 A1 * | 7/2018 | Parimelazhagan .......................... G06Q 10/0633 |
| 2018/0285839 A1 | 10/2018 | Yang et al. |
| 2018/0329399 A1 * | 11/2018 | Neelakandan ... G05B 19/41865 |
| 2019/0004932 A1 | 1/2019 | Misra et al. |
| 2019/0089740 A1 | 3/2019 | Hastings |
| 2019/0102676 A1 | 4/2019 | Nazari et al. |
| 2019/0155225 A1 | 5/2019 | Kothandaraman et al. |
| 2019/0182289 A1 | 6/2019 | White |
| 2019/0188114 A1 | 6/2019 | Hopper et al. |
| 2019/0347185 A1 | 11/2019 | Moore |

OTHER PUBLICATIONS

Shankar Mahadevan et al., A Network Traffic Generator Model for Fast Network-on-Chip Simulation, Mar. 7-11, 2005, ACM, vol. 2, pp. 780-785. (Year: 2005).

Lee Breslau et al., Advances in Network Simulation, IEEE, vol. 33, Issue: 5, May 2000, pp. 59-67. (Year: 2000).

J. Burns et al., Automatic Management of Network Security Policy, Aug. 7, 2002, IEEE, pp. 12-26. (Year: 2002).

* cited by examiner

SYSTEM FOR CONNECTION CHANNEL ADAPTION USING ROBOTIC AUTOMATION

BACKGROUND

With an increasing dependence on technology, computer systems, devices, and communication networks are relied upon to complete various tasks to increase user and/or process efficiency. However, difficulties such as program crashes, operating errors, and network communication disconnections can present themselves and interrupt typical operation of a system, device, or channel. Therefore, there is a need for a tool for adapting said systems, devices, and networks to overcome said difficulties and alleviate related inconvenience.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing a system, computer program product, and computer-implemented method for connection channel adaption using robotic automation. The invention may be exampled by a system which defines a specific embodiment of the invention. The system typically comprises a memory device comprising an entity platform associated with an entity and a robotic process automation module; a communication device in communication with a plurality of user devices associated with a user via a network; and a first processing device operatively coupled to the memory device and the communication device, wherein the processing device is configured to: establish a first communication channel with a user device associated with the user; receive, via the first communication channel, a first user input from the user on the user device for interacting with the entity platform; configure the robotic process automation module based on the first user input, wherein the robotic process automation module is configured to execute the first user input on the entity platform via one or more communication channels in response to (1) the first communication channel being terminated and (2) a second communication channel being established; detect a termination of the first communication channel; based on detecting the termination of the first communication channel, automatically establish the second communication channel with the user device associated with the user; in response to (1) detecting the termination of the first communication channel and (2) establishing the second communication channel, execute with the robotic process automation module via the second communication channel, the first user input on the entity platform; receive, via the second communication channel, a second user input from the user on the user device for interacting with the entity platform; and merge the first user input executed with the robotic process automation module and the second user input to create a complete user input itinerary, wherein the complete user input itinerary comprises all user inputs over the course of an interaction with an entity.

In some embodiments, configuring the robotic process automation module based on the first user input further comprises configuring the robotic process automation module to transform the first user input from a first format compatible with the first communication channel to a second format compatible with the second communication channel.

In some embodiments, the robotic process automation module is configured to transform the first user input from a first format to a second format based on manual configuration, a look-up table, past interactions, and/or identifying extracted values, entries, or keywords from entry fields.

In some embodiments, establishing the one or more communication channels comprises: establishing a third party communication channel with a third party system; and integrating the third party communication channel within the entity platform to present the user with a unified third party communication channel within the entity platform.

In some embodiments, the first processor is further configured to: attempt to reestablish the first communication channel before establishing the second communication channel; determine a failed attempt to reestablish the first communication channel; in response to determining the failed attempt, automatically establish the second communication channel.

In some embodiments, the first processor is further configured to attempt to reestablish the first communication channel a predetermined number of times or for a predetermined length of time before automatically establishing the second communication channel.

In some embodiments, the first processor is further configured to: configure the robotic process automation module based on the first user input and second user input, wherein the robotic process automation module is configured to execute the first user input and the second user input via the one or more communication channels in response to (1) the second communication channel being terminated and (2) a third communication channel being established; detect a termination of the second communication channel; based on detecting the termination of the second communication channel, automatically establish the second communication channel with the user device associated with the user; in response to (1) detecting the termination of the second communication channel and (2) establishing the third communication channel, execute with the robotic process automation module via the third communication channel, the first user input and the second user input on the entity platform; receive, via the third communication channel, a third user input from the user on the user device for interacting with the entity platform; and update the complete user input itinerary with the third user input.

In some embodiments, the third communication channel is the first communication channel and the first communication channel is reestablished upon termination of the second communication channel.

In some embodiments, the first, second, and third communication channels are different communication channels.

In some embodiments, the one or more communication channels comprise an application installed on the user device, a phone line, a text communication or chat, a webpage, and an in-person interaction with a representative of the entity.

In some embodiments, the entity platform comprises an integrated interaction system configured for communicating and interacting with the user via the plurality of user devices.

In some embodiments, the robotic process automation module is installed on the user device over the one or more communication channels and executes, via a second processor associated with the user device, input on the user device.

In some embodiments, the robotic process automation module simulates actual user input with the user interface by interacting directly with a presentation layer of the entity platform instead of a data layer.

In some embodiments, the termination of the first communication channel is unintentional.

In some embodiments, the first communication channel is terminated intentionally based on determining at least one of a channel error and a user difficulty associated with the first communication channel.

In some embodiments, the second communication channel is established via a second user device associated with the user.

In some embodiments, the second communication channel is selected based on user preferences of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
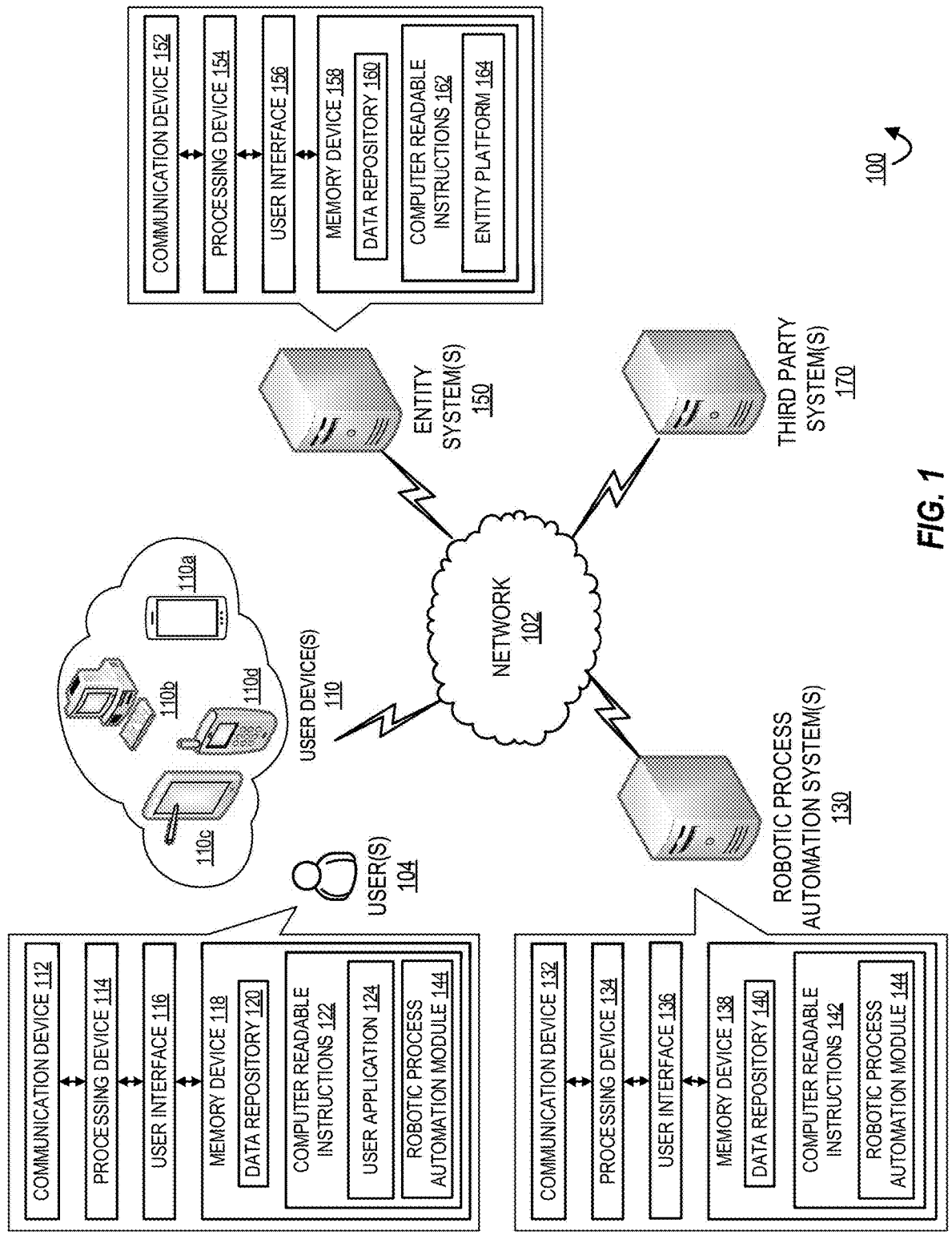
Figure 2:
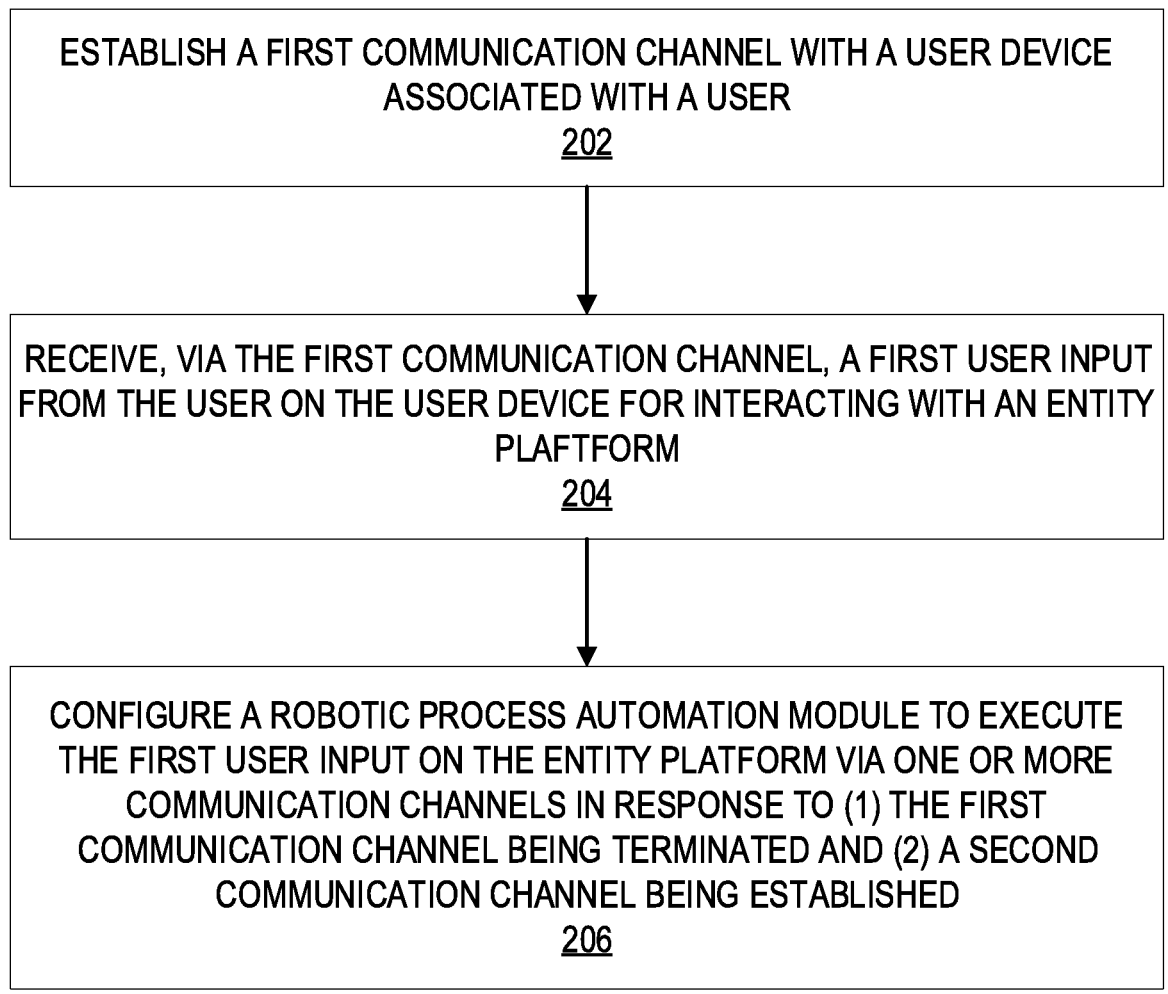
Figure 3:
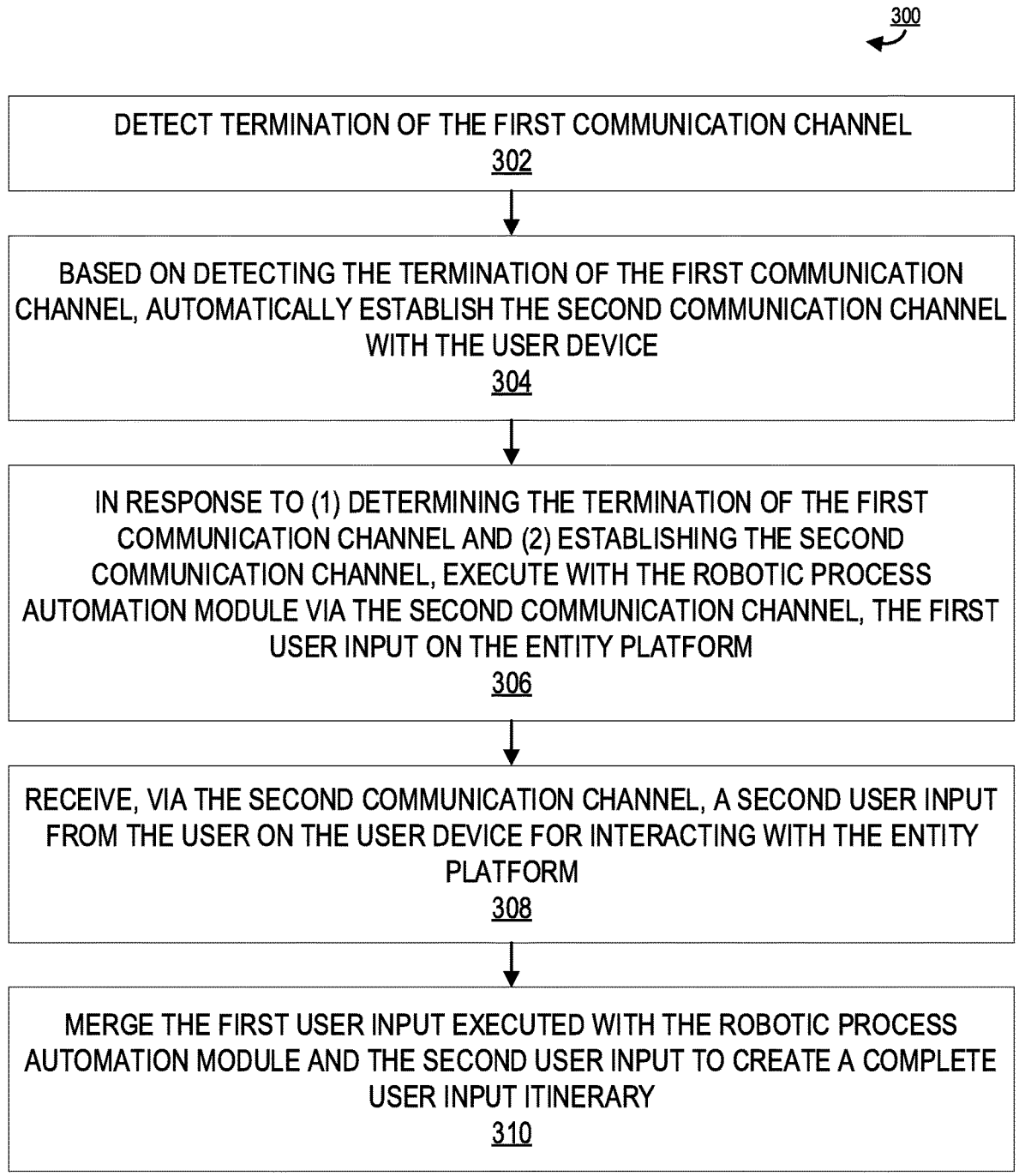
Figure 4:
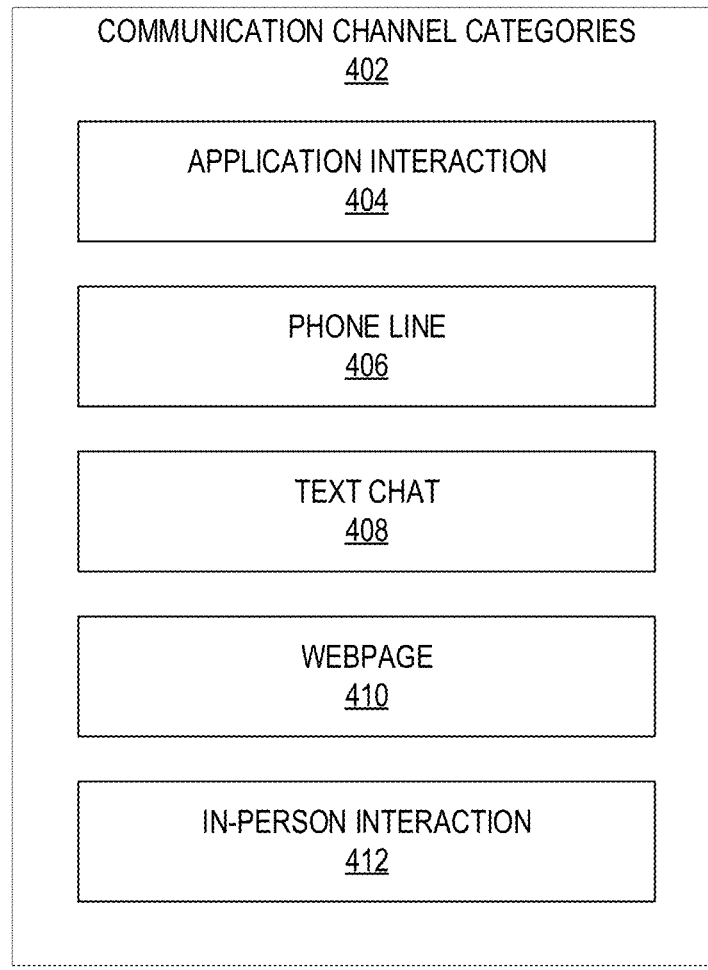

Having thus described embodiments of the invention in general terms, reference will now be made the accompanying drawings, wherein:

FIG. 1 provides an automated connection channel adaption system and environment, in accordance with an embodiment of the invention;

FIG. 2 provides a high-level process flow for configuring a robotic process automation module, in accordance with embodiments of the invention;

FIG. 3 provides a high-level process for recovering a terminated interaction using a robotic process automation module, in accordance with embodiments of the invention; and FIG. 4 illustrates communication channel categories, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

A "user" as used herein may refer to any entity or individual associated with the automated connection channel adaption system. In some embodiments, a user may be a computing device user, a phone user, a mobile device application user, a financial institution customer (e.g., an account holder or a person who has an account (e.g., banking account, credit account, or the like)), a system operator, database manager, a helpdesk support technician, and/or employee of an entity. For example, a user may be a user of a computer system or device that attempting to connect and interact with an entity, while another user may be a helpdesk technician or support representative assigned to process any tasks requested of the entity during the interaction. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In some embodiments, a user device may refer to an entity's computer system, platform, servers, databases, networked devices, or the like. The user device may be used by the user to access the system directly or through an application, online portal, internet browser, virtual private network, or other connection channel. The user device may be a computer device within a network of connected computer devices that share one or more network storage locations.

As used herein, the term "resource" may be used to refer to elements of one or more computing devices, networks, or the like available to be used in the execution of tasks or processes. A resource may include processor, memory, or network bandwidth and/or power used for the execution of tasks or processes. A resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

In accordance with embodiments of the invention, the term "entity" may be used to include any organization or collection of users that may interact with the connection channel adaption system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, asset management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

"Authentication information" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more devices, a transmission of a requested task, a reporting and correction of an error, or the like. In another example, an interaction may refer to a user interaction with a user device through a user interface in order to connect or communicate with an entity and/or entity system to complete an operation (e.g., request a transfer of funds from an account, complete a form, or the like).

As used herein, a "robotic process automation module", "RPA module", "robot", or "bot" may refer to a, device, tool, system, application, or the like for performing automated processes on a user device, computer system, server, or the like. Robotic process automation may refer to the automation of high-volume processes using said modules. The RPA module is typically specialized computer software or hardware installed on a device that mimics user interaction with a user interface (UI). For example, an RPA module may provide inputs to the UI of other applications. The RPA module may only interact with a presentation layer of the computer system (i.e., the UI) and avoids more demanding interaction with any underlying data layers or logic of the underlying system in order to instruct operation of the user device, computer system, application, or the like. In some embodiments, the module may be configured to repeat one or more tasks assigned to or stored by the module. Further an RPA module is scalable, wherein a plurality of bots may be used to perform various functions for high-volume applications related to executable tasks of said entity.

RPA modules or "bots" are used throughout various industries to automatically execute one or more processes typically on the back-end of a computing system or device. These bots can be embodied as customized software that can be installed on a computer system and that interacts directly with other devices, systems, applications, or the like in a way that mimics user activity on said devices, systems, or application. These highly customizable bots can be configured to perform tasks such as web-scraping, screen-scraping, gathering and comparing data, and document and data storage (e.g., in a central repository for future access). However said bots also have the capability, based on their configuration, to perform more complex tasks such as those tasks described herein. Bots uniquely instruct other devices, systems, and applications how to operate and accomplish assigned tasks. Traditionally, similar instruction and integration with existing systems required the use of particular machine-to-machine forms of communication based on data layers such as Application Programming Interfaces (APIs) which operate at an architectural layer or data layer beneath a user interface. This form of data layer integration is normally costly, time-consuming, and generally requires substantial investment on behalf of an entity especially if the results are desired on a large-scale. Furthermore, transformation of existing systems to accommodate newly required capabilities can be technically complex requiring trained specialists or expertise and can be risky for a large-scale entity.

The implementation of bots within an existing system provides a departure from these traditional forms of integration. Bots are trained to mimic user activity directly with a UI by only addressing a presentation layer of the computer system or device, not the underlying data layer of the system. The bot may transmit signals and commands electronically which mimic or simulate input signal sent directly through the UI. For example, a bot may transmit signals which simulate mouse and keyboard inputs to execute commands and perform automated tasks. These bot commands may not occur on a display device itself, but rather be performed in a virtual environment wherein the bot interprets the display of a screen electronically. Further, advantageously, these bots can be "trained" or essentially programmed to execute tasks simply by even a non-tech-savvy user through the use of simple drag and drop task functionality or configuration wizards without any required coding experience or code-based instructions. Bots typically comprise some form of developer tools for defining jobs or tasks that may comprise step-by-step instructions, rules, condition logic, if/then decision making, or the like. A robot controller of the bot may act as a master repository for providing tasks, credentials, permissions, or the like to bots and users only when required in order to assign jobs while monitoring and reporting job execution and status. Meanwhile, the bots themselves interact directly with the systems, applications, or the like to complete said jobs. Bots may further comprise a process recorder for capturing and recording a sequence of user actions for further training or completing tasks comprising said user actions. This feature may prove valuable for error analysis and correction and for user convenience as well as for regulatory compliance with audits. Bots especially allow large entities to avoid the laborious process of traditional system redesign typically associated with existing system integration of new tasks, systems, or the like. Bots allow for a simple, timely, and low-cost alternative to traditional methods and are further attractive due to their scalability, consistency, and reusability.

The present invention leverages robotic process automation (RPA) technology to overcome the technical difficulties and problems discussed above to diagnose and rectify errors (such as communication channel disconnections) experienced during typical operation of a system or user device. By leveraging robotic process automation technology, the present invention reduces the amount of computing resources required to execute tasks when compared with executing the same tasks using a traditional application programming interface (API). Furthermore, due to the simple nature of designing and tailoring the functions of bots, a user or entity would be able to avoid the costly and time-consuming process of building a new and complicated API-based systems from the ground up. Additionally, the bots are able to transform output signals to simulate input signals related to input devices of a user interface (e.g., keyboards, mouse, touch-screen, microphone, or the like) allowing for the simulation of user input directly at the presentation layer of the application. Other applications or programs would not typically interact with another application in this manner, instead interaction through the data layer would require more complex programming. The bot application however interacts with the application at the user interface level and has the ability to input information or data into another application, whereas a typical application would be waiting for an input.

Embodiments of the present invention are directed to providing connection channel adaption using robotic automation. The invention leverages a robotic process automation module to generate an operation record based on previous user device input in order to automatically recover and continue a previous interaction with an entity platform conducted over a terminated connection channel. The system automatically establishes a new connection channel upon determining the initial channel termination while retaining previous user input interaction progression within the entity platform. Further, the module may be configured to transform the user input to be compatible with the new connection channel allowing for seamless continuation of the interaction to minimize downtime.

Furthermore, the system transforms user input previously provided by the user to a new format in order to make the user input compatible with a new communication channel. The system may further transform communication channels themselves by, for example, integrating a third party communication channel and/or interface into an entity platform. In this way, the system presents a unified platform appearance to the user for interacting with the third party while retaining the user within the entity platform.

FIG. 1 provides a block diagram illustrating an automated connection channel adaption system and environment 100, in accordance with an embodiment of the invention. The environment 100 includes a user device 110 associated and/or used with authorization of a user 104, a robotic process automation (RPA) system 130, an entity system 150, and a third party system 170. In some embodiments, the user device 100 may comprise a plurality of user devices 110a, 110b, 110c, and 110d which may all be associated with the user. It should be understood, that within the environment 100 there may be more than one of any of the components or systems described or that one or more of components or systems may be embodied as a single system or device.

As used herein, a "processing device," such as the processing devices 114, 134, and 154 generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" such as the user interfaces 116, 136, and 156, generally includes a plurality of interface devices and/or software that allow a user to input commands and/or data to direct the processing device to execute instructions or tasks. For example, the user interfaces presented in FIG. 1 may include a graphical user interface (GUI) or an interface to input computer-executable instructions that direct the processing device to carry out specific functions. The user interface employs certain input and output devices to input data received from a user or output data to a user. When a user interacts with the input and output devices, the device or system generates a signal specific to that input device to process the user interaction. These input and output devices may include a display, mouse, keyboard, keypad, button, touchpad, touch screen, microphone, speaker, LED, light, joystick, switch, buzzer, bell, and/or other user input/output device for communicating with one or more systems, devices, and/or other users. Typically a user interacts with a user interface of a device which is managed by and bridged to data accessed by a data layer via a presentation layer. The presentation layer communicates with the data layer to translate messages, commands, and the like between the user and the data layer of an application.

As used herein, a "memory device" such as memory devices 118, 138, and 158, generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication device" generally includes a modem, server, transceiver, and/or other device for communicating with other devices on a network, and/or a user interface for communicating with one or more customers. Referring again to FIG. 1, the communication devices 112, 132, and 152 comprise communication interfaces having one or more devices configured to communicate with one or more other devices on a network, such as a mobile device, a cellular or landline device, a personal computing device, a server, a distributed computing cluster, third party systems, and/or the like. The processing device is configured to use the network communication device to transmit and/or receive data and/or commands to and/or from the other devices connected to the network. Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information. A communication device and/or communication interface may be used by the system to establish one or more communication or connection channels between users, devices, systems, or the like.

The systems and devices communicate with one another over the network 102 and perform one or more of the various steps and/or methods according to embodiments of the disclosure discussed herein. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet. In some embodiments, the network 102 may comprise a cellular or landline network.

The user device 110 includes a communication device 112 communicably coupled with a processing device 114, which is also communicably coupled with a memory device 118. In some embodiments, the communication device 112 may also comprise a GPS transceiver capable of determining a geographic location associated with the user device 110. The processing device 114 is configured to control the communication device 112 such that the user device 110 communicates across the network 102 with one or more other systems. The processing device 114 is also configured to access the memory device 118 in order to read the computer readable instructions 122, which in some embodiments includes a user application 124. The user application 124 allows for communication of the user device 110 with the other systems and devices within the environment 100 such as the RPA system 130 and/or entity system 150. The user application 124 allows the user 104 to receive information transmitted as well as input information requested by the other systems and communicate with and request the execution of tasks from the RPA system 130, application, or module; the entity system 150; one or more third parties; and/or other entities. In some embodiments, the user application 124 further allows the user to interact with and/or manipulate the user application 124 via the user device 110 and the user interface 116. The memory device 118 also includes a data repository 120 or database for storing pieces of data or files that can be accessed by the processing device 114.

The robotic process automation (RPA) system 130 includes a communication device 132 communicably coupled with a processing device 134, which is also communicably coupled with a memory device 138. The processing device 134 is configured to control the communication device 122 such that the RPA system 130 communicates across the network 102 with one or more other systems. The processing device 134 is also configured to access the memory device 138 in order to read the computer readable instructions 142, which in some embodiments includes a RPA module 144 or application. The RPA module 144 allows for communication with the other systems and devices within the environment 100 such as the user device 110 and/or the entity system 150 and for the customization and installation of a RPA module or "bot" on another device in the system such as the user device 110. The memory device 138 also includes a data repository 140 or database for storing pieces of data or files that can be accessed by the processing device 134. In some embodiments, the data repository 140 may be used to store an operation record of user actions or an error log, said user actions or input may be then substantially replicated or simulated by the RPA module. In some embodiments, the data repository 140 further comprises a suite of additional applications or built in functions for use by the RPA system 130. In some embodiments, the RPA system 130 may be part of the user device 110 and/or entity system 150.

The entity system 150 includes a processing device 154 operatively coupled to a network communication device 152 and a memory device 158. The processing device 154 is configured to control the communication device 152 such that the entity system 150 communicates across the network 102 with one or more other systems. The processing device 154 is also configured to access the memory device 158 in order to read the computer readable instructions 162, which in some embodiments includes an entity platform 164 or application. The entity platform 164 allows for communication with the other systems and devices within the environment 100 such as the user device 110 and/or the RPA system 130. The platform may provide the entity with an integrated hub for executing operations and tasks from a collection of products, applications, and data used and stored by the entity. The platform may further comprise a centralized collection of a plurality of communication channels which may be monitored and accessed by and presented to representatives of the entity to facilitate interactions with users or customers. In some embodiments, the entity platform 164 may be an internal software application for collecting and providing access to the totality of the entity systems and data provided a user accessing said application has proper authentication credentials. In some embodiments, tasks or operations requested by the user of the entity are routed through and executed by the entity platform 164. The memory device 158 also includes a data repository 160 or database for storing pieces of data or files that can be accessed by the processing device 154. In some embodiments, the data repository 160 may store user information or device information for a user or device that is associated with the entity (e.g., a customer and the customer's device).

The environment 100 may further comprise one or more third party systems 170 which may be constructed substantially similarly to the other systems described herein such as the entity system 150.

The user application 124, the RPA module 144, and the entity application 164 are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the RPA module 144 is stored and configured for being accessed by a processing device of the user device 110 connected to the network 102. In various embodiments, the user application 124, the RPA module 144, and the entity application 164 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one or more of the systems discussed above, such as the entity system 150, may be embodied as more than one system and the various components of the system are not collocated, and in various embodiments, there are multiple components performing the functions indicated herein as a single device. For example, in one embodiment, multiple processing devices may perform the functions of the processing device 134 of the RPA system 130 described herein. Furthermore, one or more of the various device and/or systems described herein may be embodied as one or more combined devices and/or systems.

In various embodiments, the user device 110, the RPA system 130, the entity system 150, and/or other systems may perform all or part of a one or more method or process steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

FIG. 2 provides a high-level process flow for configuring a robotic process automation module, in accordance with embodiments of the invention. Referring now to block 202 of FIG. 2, the system initially establishes a first communication channel with a user device associated with the user. As used herein, a "communication channel", "connection channel", "connection", or "channel" may refer to any pathway allowing for an interaction between a user and an entity. As illustrated in FIG. 4, a communication channel categories 402 may comprise an application 404 (e.g., a mobile device application), a cellular or landline phone line 406, a text-based chat or messaging service 408, a webpage 410, and an in-person interaction 412 (i.e., an interaction between a user and a representative of the entity at a brick-and-mortar location). Establishment of said first communication channel comprises generating a connection between the user device and one or more of the other systems and devices described herein (e.g., the entity system 150 or the RPA system 130) to conduct an interaction. In some embodiments, the system may establish one or more first communication channels, wherein an interaction may be conducted over a plurality of communication channels (e.g., the user communicates with the entity over the phone while performing tasks on webpage of the user's computer related to the same interaction).

Next at block 204 of FIG. 2, the system receives, via the first communication channel, a first user input from the user on the user device for interacting with an entity platform. The first user input may comprise any user interaction or operation performed via the user interface of the user device through a particular communication channel (e.g., data entry into a blank field, selection from a drop-down menu, entry of a number on a keypad, a spoken command provided through a microphone receiver, or the like). The one or more operations can be executed manually by the user via a user interface or automatically by the user device or application itself (e.g., a text autofill function). The system monitors for one or more inputs of the user via the user device and/or an application executed on the user device. The system generates an operation record using the RPA module. The operation record generally comprises a recording of the user inputs or operations executed on the user device. In some embodiments, the RPA module may monitor, receive, and store the one or more user inputs or operations.

The operation record may further comprise user information, device information, or the like in addition to the record of operations. For example, the operation record may be used to store device information such as resource use and availability, device identification information (e.g. serial numbers, device specifications), or the like. Additionally, the operation record may further comprise user information such as usernames, passwords, authentication credentials, or other personal identifying information which may have been input and/or stored by the user within the application during operation. Further, the operation record may comprise any data or information entered by the user into a user interface of the application (e.g., selected options, altered settings, completed fields or the like). The operation record may be collected as a list of executed commands or input data detected by the system such as in a text file, .csv file, or the like.

At block 206 of FIG. 2, the system configures a robotic process automation (RPA) module to execute the first user input on the entity platform via one or more communication channels. As previously discussed, the RPA module may be configured to detect one or more inputs of the user on the user device for interaction with the entity platform and simulate those same inputs on a presentation layer of a user interface. The RPA module may be configured to execute the previously collected operation record of the user on the entity platform on behalf of the user without requiring a user to reenter the first user input. Specifically, the RPA module may execute said user inputs on the platform when the first communication channel is terminated. In this way, previous interaction progress achieved by the user after the initial establishment of the first communication channel can be preserved without requiring the user to repeat the previous user input. For example, this may be especially convenient to the user after completing a series of time-consuming forms or documents. Additionally, this process may improve data consistency by eliminating the potential for the entry of incongruous data by the user during a reentry of said data.

As the user input may be executed by the RPA module on one or more communication channels that are different than the first communication channel, in some embodiments, the RPA module is configured to transform the received user input from one format that is compatible with the first communication channel to another format that is compatible with another communication channel. For example, the module may convert a number spoken by the user over a microphone receiver of a telephone into text for entry into a field of a webpage or application. The RPA module may accomplish this user input conversion by referencing a similar past interactions or conversions, identifying extracted values input by the user (e.g., identifying the format of a social security number, address, phone number, or the like), identifying keywords or other entries from entry fields, referencing a look-up table, and/or through manual configuration. The RPA module may require at least initial programming or "teaching" by a user or entity representative to be configured for transforming a format of a user input. In some embodiments, the module may leverage machine learning to further improve conversion by better recognizing a type and form of a user input and the equivalent user input format in other communication channels through repeated operation of the module.

In some embodiments, the system installs and/or configures the RPA module on the user device. Installation of the RPA module on a device may be triggered through a manual installation of the module by the user. For instance, the user may select and download the module from a source such as an app store. In another embodiment, the user device may be commanded by one of the other systems described herein (e.g., the RPA system) to automatically install the RPA module on the user device with at most minimal input from the user such as accepting the installation when prompted. The installation command and/or the installation itself may occur remotely over the network. In yet another embodiment of the invention, the RPA module may be installed to the user device through another application (e.g., a customer support application, a mobile banking application, an entity's internal operations application, or the like). For example, a client may be accessing a mobile banking application associated with a banking entity on a mobile device. Upon detecting access to the mobile banking application via the mobile device, the banking entity's system may automatically instruct the user device to install the RPA module via the mobile banking application with or without requiring explicit permission from the user. In other embodiments, the RPA module may be installed and hosted on a system other than the user device (e.g., the RPA system or entity system), wherein the RPA module remotely interacts with the user device over the network. In some embodiments, the RPA module may be installed in response to establishment of the first communication channel, wherein the module may be installed over the first communication channel. In some embodiments, the RPA module may command the processing device of the user device to execute one or more operations or previously performed user inputs. In some embodiments, the RPA module may operate in the background of another application without interrupting the normal operating routine of the user within an application. For example, the one or more operations may comprise the user executing a series of commands within an application, deleting or otherwise altering files, entering data or information via a user interface, or the like. In some embodiments, the RPA module may be first configured on the entity system before being installed on the user device already configured. In yet other embodiments, the RPA module may be configured and operated from the entity system, wherein the RPA module performs its functions with the user device over the network.

In some embodiments, the RPA module may be configured to connect with the user upon establishment of a communication channel in order to automatically authenticate the user before being connected with a system or representative of the entity. The RPA module may communicate with the user device and receive authentication information from the user and/or user device and compare the received information to an authentication database to determine a match between the received and stored authentication information to determine that the user and/or user device are an authenticated or authorized user and/or user device. The RPA module may then automatically transfer and connect the pre-authenticated user to the entity system or representative over the previously established communication channel. In this way, the user and/or user device may be authenticated before the interaction, thus saving time and resources. In some embodiments, the received authentication information may be stored and automatically entered by the RPA module when automatically establishing a new communication channel.

In some embodiments, the RPA module may be configured to for natural language processing and/or sentiment analysis to determine a state or mood of a user prior to or during an interaction with the entity (i.e., via a system or entity representative). The RPA module may use speech-to-text functions and/or other input device of the user device (i.e., a keyboard and mouse, an audio receiver, a touch screen interface, etc.) to determine the state or mood of the user. Based on the determined state or mood of the user, the RPA module may then alter one or more conditions of the interaction and/or communication channel established with the user (e.g., type of communication channel, response time, position of representative connected to, etc.). For example, the RPA module may identify disgruntled talking of a user on hold, erratic breathing patterns, elevated voice volume, or the like and, in response, automatically route the user to a faster response tier for a better user experience and user retention.

Continuing the process of FIG. 2 and referring now to FIG. 3, at block 302, the system detects a termination of the first communication channel. A termination of the first communication channel may be an unintentional termination resulting from user error or technical difficulties. For example, the termination of the first communication may comprise a dropped call, a device disconnection from the network, a malfunction of a user input device, or the like. The termination of the first communication channel may also be an intentional termination, wherein the user or the system actively terminates the connection based on one or more conditions. For example, the system may detect an error with the communication channel itself such as high latency, constant disconnecting and reconnecting, poor connection quality, poor reception, or the like. The system may also detect a user difficulty with the current communication channel. For example, the system may detect a number of user input errors exceeding a predetermined threshold, a length of time between user inputs over a predetermined threshold, a signal error received from a user input device, a user request for an alternative communication channel, or the like which would indicate a user difficulty or a user preference for an alternative connection channel type. In response, the system may intentionally and automatically terminate the current communication channel. The system may further request user approval before terminating the current channel and inform the user of the termination before terminating the channel. The system may also inform the user of an alternative communication channel that will instead be used.

At block 304 of FIG. 3, the system automatically establishes the second communication channel with the user device based on detecting the termination of the first communication channel. Typically, the second communication channel is a different communication channel than the first to resolve any issues surrounding the previous termination. In this way, an inconvenience to the user as a result of a previously terminated communication channel may be reduced or eliminated, wherein the previous interaction may be continued with minimal downtime.

In some embodiments, the system may first attempt to reestablish the first communication channel before automatically establishing the second communication channel. In response to a failed attempt to reestablish the first communication channel, the system may automatically establish the new, second communication channel to continue the interaction with the user. The system may determine the failed attempt at reestablishing the second communication channel after attempting to reestablish the first communication channel a predetermined number of times or for a predetermined length of time (e.g., 20 seconds).

In some embodiments, the system may establish the second communication channel via a second user device associated with the user. For example, the system may call a mobile device (e.g., a cellular phone) associated with the user after the user being disconnected from an online application on a computing device (e.g., a PC) associated with the user. In some embodiments, the selection of the second communication channel and/or the user device associated with the user may be determined automatically by the system. In other embodiments, the user may input a specified alternative communication channel for continuing the interaction. In some embodiments, the system may reference user preferences of the user to automatically determine the second communication channel and user device. For example, the user may have previously input a preference to never be contacted by a phone call and instead to be contacted by text message.

Next, at block 306 of FIG. 3, the system executes, with the robotic process automation module via the second communication channel, the first user input on the entity platform. Typically, the system executes the first user input in response to the previous determining of the termination of the first communication channel and the establishing of the second communication channel. Execution of the first user input on the entity platform may comprise simulating, mimicking, or reentering the first user input on the entity platform via the new, second communication channel which, as previously discussed, may require the first user input to be in a new format. By automatically executing the first user input via the second communication channel, the user interaction with the entity platform may be resumed immediately or nearly immediately following a previous termination of the initial communication channel. In this way, the interaction may be resumed with any previous progress preserved by the RPA module so that the user is not required to reenter information or data.

Essentially, the simulated user input executed by the RPA module acts as a back-up to the user's progress. In some embodiments, the RPA module may be configured to execute the user input in parallel with the user in real-time within a virtual environment, wherein the progress of the simulated user input may be transferred to the new communication channel to resume the interaction.

As previously discussed, the RPA module interacts directly with a presentation layer of the entity platform to simulate user input received from the input devices or user interfaces of the various communication channels. In this way, the RPA module can execute an operation while simulating a user interaction with the platform. By simulating a user input and interacting directly with the presentation layer of the application, the RPA module can be easily implemented without the need to design a more complex solution for interacting with a data layer of the platform.

Moving on to block 308 of FIG. 3, the system next receives, via the second communication channel, a second user input from the user on the user device for interaction with the entity platform. The second user input is a new user input for continuance of the recovered or preserved interaction between the user via the user device and the entity platform. The second user input is able to continue the interaction from the end of the first user input at the point of termination of the first communication channel.

Finally, at block 310 of FIG. 3, the system merges the first user input recovered and executed with the robotic process automation module and the second user input to create a complete user input itinerary. The complete user input itinerary typically comprises all user input received by the entity platform from the plurality of user devices associated with the user over the course of the interaction with the entity.

In some embodiments, after receiving the second user input via the newly established second communication channel, the system may further configure the RPA module to execute the first user input and the second user input. Similar to the previously discussed process, in response to detecting a termination of the second communication channel and establishing a third communication channel, the RPA module executes via the third communication channel the first and second user inputs on the entity platform, thereby again recovering all previous interaction progress. The complete user itinerary may also be updated after receiving additional user input following recovery. In some embodiments, the system may revert to and reestablish the first communication channel as the third communication channel upon termination of the second communication channel. In other embodiments, the first, second, and third communication channels may all be different communication channels.

In some embodiments, the entity system and or other systems may be in communication with a third party system as illustrated in the system environment 100 of FIG. 1. The third party may be an outside vendor, service provider, or the like associated with the entity and/or the user, wherein products, services, and/or data may be request or required from the third party by the user and/or the entity. The system may establish a third party communication channel with the third party system to access said products, services, and/or data. In some embodiments, the system may integrate the third party communication channel within the entity platform to present the user with a unified third party communication channel presented within the entity platform. In this way, the system may continue a user interaction requiring third party involvement while retaining the user within the entity platform.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein.

Moreover, it should be understood that the process flows described herein include transforming the information sent and/or received from the applications of the different systems (e.g., internally or externally) and/or the devices from one or more data formats into a data format associated with the application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, are merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for connection channel adaption using robotic automation, the system comprising:
   a memory device comprising a robotic process automation module;
   a communication device in communication with a plurality of user devices associated with a user via a network; and
   a first processing device operatively coupled to the memory device and the communication device, wherein the first processing device is configured to:
      establish a first communication channel with a user device associated with the user;
      receive, via the first communication channel, a first user input from the user on the user device for interacting with an entity platform;
      train the robotic process automation module based on the first user input, wherein the robotic process automation module is trained to execute the first user input on the entity platform via one or more communication channels in response to (1) the first communication channel being terminated and (2) a second communication channel being established;
      detect a termination of the first communication channel;
      based on detecting the termination of the first communication channel, automatically establish the second communication channel with the user device associated with the user;
      in response to (1) detecting the termination of the first communication channel and (2) establishing the second communication channel, execute with the robotic process automation module via the second communication channel, the first user input on the entity platform;
      receive, via the second communication channel, a second user input from the user on the user device for interacting with the entity platform; and
      merge the first user input executed with the robotic process automation module and the second user input to create a complete user input itinerary during an interaction with an entity.

2. The system of claim 1, wherein training the robotic process automation module based on the first user input further comprises training the robotic process automation module to transform the first user input from a first format compatible with the first communication channel to a second format compatible with the second communication channel.

3. The system of claim 2, wherein the robotic process automation module is trained to transform the first user input from a first format to a second format based on manual configuration, a look-up table, past interactions, identifying extracted values, entries, or keywords from entry fields.

4. The system of claim 1, wherein establishing the one or more communication channels comprises:
   establishing a third party communication channel with a third party system; and
   integrating the third party communication channel within the entity platform to transform the third party communication channel into a unified third party communication channel, wherein the unified third party communication channel is presented to the user within the entity platform.

5. The system of claim 1, wherein the first processing device is further configured to:
   attempt to reestablish the first communication channel before establishing the second communication channel;
   determine a failed attempt to reestablish the first communication channel;
   in response to determining the failed attempt, automatically establish the second communication channel.

6. The system of claim 5, wherein the first processing device is further configured to attempt to reestablish the first communication channel a predetermined number of times or for a predetermined length of time before automatically establishing the second communication channel.

7. The system of claim 1, wherein the first processing device is further configured to:
   train the robotic process automation module based on the first user input and second user input, wherein the robotic process automation module is trained to execute the first user input and the second user input via the one or more communication channels in response to (1) the second communication channel being terminated and (2) a third communication channel being established;
   detect a termination of the second communication channel;
   based on detecting the termination of the second communication channel, automatically establish the third communication channel with the user device associated with the user;
   in response to (1) detecting the termination of the second communication channel and (2) establishing the third communication channel, execute with the robotic process automation module via the third communication channel, the first user input and the second user input on the entity platform;
   receive, via the third communication channel, a third user input from the user on the user device for interacting with the entity platform; and
   update the complete user input itinerary with the third user input.

8. The system of claim 7, wherein the third communication channel is the first communication channel and the first communication channel is reestablished upon termination of the second communication channel.

9. The system of claim 7, wherein the first, second, and third communication channels are different communication channels.

10. The system of claim 1, wherein the one or more communication channels comprise an application installed on the user device, a phone line, a text communication or chat, a webpage, and an in-person interaction with a representative of the entity.

11. The system of claim 1, wherein the entity platform comprises an integrated interaction system configured for communicating and interacting with the user via the plurality of user devices.

12. The system of claim 1, wherein the robotic process automation module is installed on the user device over the one or more communication channels and executes, via a second processing device associated with the user device, the first user input on the user device.

13. The system of claim 1, wherein the robotic process automation module simulates the first user input with a user interface by interacting directly with a presentation layer of the entity platform instead of a data layer.

14. The system of claim 1, wherein the termination of the first communication channel is unintentional.

15. The system of claim 1, wherein the first communication channel is terminated intentionally based on determining at least one of a channel error and a user difficulty associated with the first communication channel.

16. The system of claim 1, wherein the second communication channel is established via a second user device associated with the user.

17. The system of claim 1, wherein the second communication channel is selected based on user preferences of the user.

18. A computer program product for connection channel adaption using robotic automation, the computer program product comprising at least one non-transitory computer-readable medium having computer-readable program code portions embodied therein, the computer-readable program code portions comprising:

- an executable portion configured for establishing a first communication channel with a user device associated with a user;
- an executable portion configured for receiving, via the first communication channel, a first user input from the user on a user device associated with the user for interacting with an entity platform;
- an executable portion configured for training a robotic process automation module based on the first user input, wherein the robotic process automation module is trained to execute the first user input on the entity platform via one or more communication channels in response to (1) the first communication channel being terminated and (2) a second communication channel being established;
- an executable portion configured for detecting a termination of the first communication channel;
- an executable portion configured for, based on detecting the termination of the first communication channel, automatically establishing the second communication channel with the user device associated with the user;
- an executable portion configured for, in response to (1) detecting the termination of the first communication channel and (2) establishing the second communication channel, executing with the robotic process automation module via the second communication channel, the first user input on the entity platform;
- an executable portion configured for receiving, via the second communication channel, a second user input from the user on the user device for interacting with the entity platform; and
- an executable portion configured for merging the first user input executed with the robotic process automation module and the second user input to create a complete user input itinerary during an interaction with an entity.

19. The computer program product of claim 18, wherein training the robotic process automation module based on the first user input further comprises training the robotic process automation module to transform the first user input from a first format compatible with the first communication channel to a second format compatible with the second communication channel.

20. A computer-implemented method for connection channel adaption using robotic automation, the method comprising:

- establishing a first communication channel with a user device associated with a user;
- receiving, via the first communication channel, a first user input from the user on a user device associated with the user for interacting with an entity platform;
- training a robotic process automation module based on the first user input, wherein the robotic process automation module is trained to execute the first user input on the entity platform via one or more communication channels in response to (1) the first communication channel being terminated and (2) a second communication channel being established;
- detecting a termination of the first communication channel;
- based on detecting the termination of the first communication channel, automatically establishing the second communication channel with the user device associated with the user;
- in response to (1) detecting the termination of the first communication channel and (2) establishing the second communication channel, executing with the robotic process automation module via the second communication channel, the first user input on the entity platform;
- receiving, via the second communication channel, a second user input from the user on the user device for interacting with the entity platform; and
- merging the first user input executed with the robotic process automation module and the second user input to create a complete user input itinerary during an interaction with an entity.

* * * * *